US008664803B2

(12) United States Patent
Urano

(10) Patent No.: US 8,664,803 B2
(45) Date of Patent: Mar. 4, 2014

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 235 days.

(21) Appl. No.: 13/273,547

(22) Filed: Oct. 14, 2011

(65) Prior Publication Data

US 2012/0161534 A1 Jun. 28, 2012

Related U.S. Application Data

(60) Provisional application No. 61/427,611, filed on Dec. 28, 2010.

(51) Int. Cl.
*H01F 27/42* (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| | | | |
|---|---|---|---|
| 6,626,363 B2 | 9/2003 | Arisawa | |
| 7,741,734 B2 | 6/2010 | Joannopoulos et al. | |
| 2003/0190110 A1* | 10/2003 | Kline | 385/15 |
| 2007/0222542 A1 | 9/2007 | Joannopoulos et al. | |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1* | 3/2009 | Cook et al. | 307/104 |
| 2009/0079268 A1 | 3/2009 | Cook et al. | |
| 2009/0102292 A1 | 4/2009 | Cook et al. | |

(Continued)

FOREIGN PATENT DOCUMENTS

| | | |
|---|---|---|
| JP | A-2000-165132 | 6/2000 |
| JP | A-2006-230032 | 8/2006 |

(Continued)

OTHER PUBLICATIONS

Translation of an International Preliminary Report on Patentability dated Jul. 18, 2013 issued in PCT/JP2011/078811.

*Primary Examiner* — Stephen W Jackson
*Assistant Examiner* — Joseph Inge
(74) *Attorney, Agent, or Firm* — Oliff PLC

(57) ABSTRACT

A wireless power receiver according to an embodiment of the present invention is a wireless power receiver which acquire power by a non-contact method from a wireless power feeder, the wireless power receiver having: a power receive resonance circuit that includes a power receive coil and power receive capacitor and acquires power from a power feed coil of the wireless power feeder by means of the power receive coil on the basis of a magnetic field resonance effect between the power feed coil and the power receive coil; a power receive load coil that receives the power fed from the power receive coil by a non-contact method; and an impedance converter that is arranged between the power receive load coil and a load and in which a primary impedance connected to the power receive load coil is higher than a secondary impedance connected to the load.

8 Claims, 12 Drawing Sheets

(56) References Cited

U.S. PATENT DOCUMENTS

| | | |
|---|---|---|
| 2009/0134712 A1 | 5/2009 | Cook et al. |
| 2009/0167449 A1 | 7/2009 | Cook et al. |
| 2009/0179502 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284082 A1* | 11/2009 | Mohammadian ............. 307/104 |
| 2009/0284083 A1 | 11/2009 | Karalis et al. |
| 2010/0033156 A1* | 2/2010 | Abe et al. ...................... 323/305 |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0164295 A1* | 7/2010 | Ichikawa et al. .............. 307/104 |

FOREIGN PATENT DOCUMENTS

| | | |
|---|---|---|
| JP | A-2010-104159 | 5/2010 |
| JP | A-2010-166693 | 7/2010 |
| JP | A-2010-233442 | 10/2010 |
| WO | WO 2006/022365 A1 | 3/2006 |
| WO | WO 2010/101078 A1 | 9/2010 |

* cited by examiner

PHASE OF RESONANCE CURRENT
BASED ON RESONANCE VOLTAGE

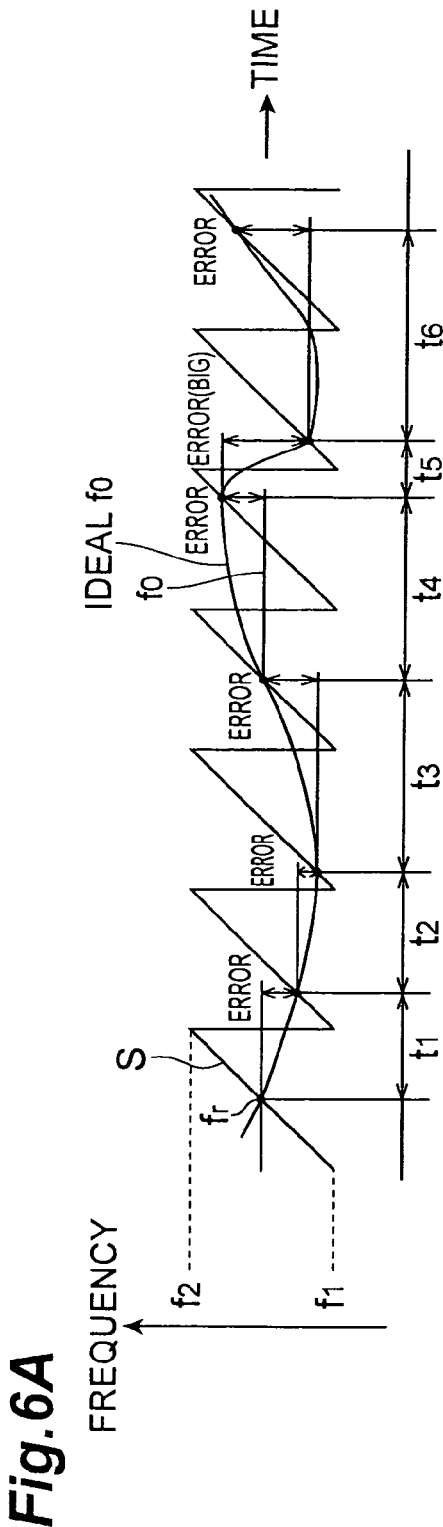
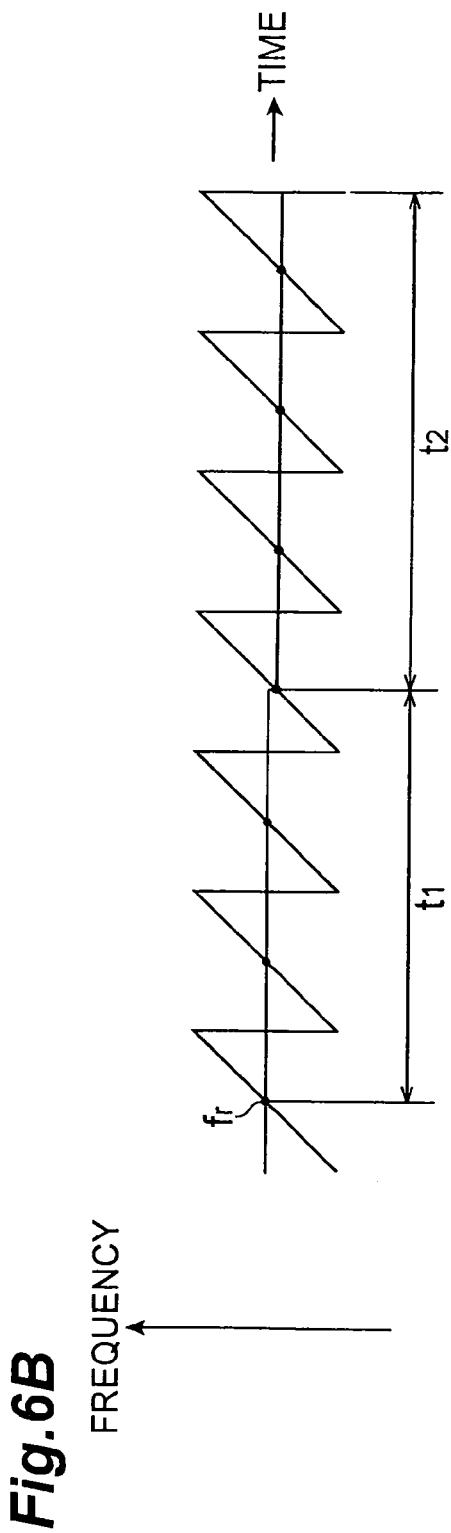
Fig.6A
Fig.6B

WIRELESS POWER FEEDER, WIRELESS POWER RECEIVER, AND WIRELESS POWER TRANSMISSION SYSTEM

CROSS REFERENCE TO RELATED APPLICATION

This application claims priority to U.S. Provisional Application No. 61/427,611 filed on Dec. 28, 2010 by the same Applicant, which is hereby incorporated by reference in its entirety.

BACKGROUND OF THE INVENTION

1. Field of the Invention

The present invention relates to a wireless power feeder, wireless power receiver and wireless power transmission system for transmitting power by a non-contact method.

2. Related Background Art

Japanese Patent Application Publication No. 2010-233442 discloses a wireless power transmission system for transmitting power from a wireless power feeder to a wireless power receiver by a non-contact method (wirelessly). In this wireless power transmission system, a wireless power feeder 1 and wireless power receiver 2 have a power feed resonance circuit 12 and power receive resonance circuit 21, respectively, wherein non-contact power transmission is carried out using a magnetic field resonance effect between the power feed resonance circuit 12 and the power receive resonance circuit 21.

In this type of wireless power transmission system, when, for example, the relative distance between the power feed resonance circuit 12 and the power receive resonance circuit 21 changes, the state of coupling between the power feed resonance circuit 12 and the power receive resonance circuit 21 changes, lowering the power transmission efficiency.

In this regard, Japanese Patent Application Publication No. 2010-233442 discloses an invention which detects an impedance observed from a power feeder side, and sets; in accordance with the absolute value or the phase of the detected impedance, a frequency of an AC power fed to the power feed resonance circuit 12. The wireless power feeder 1 has an oscillator 11 for inputting the AC power to the power feed resonance circuit 12, an impedance detecting apparatus 4 for detecting the impedance observed from the power feeder side within a predetermined frequency range, and a frequency varying apparatus 3 for setting the frequency of the AC power input to the power feed resonance circuit 12, in accordance with the absolute value or the phase of the detected impedance. Therefore, the lowering of the power transmission efficiency can be prevented even when the state of coupling between the power feed resonance circuit 12 and the power receive resonance circuit 21 changes.

Note that the wireless power receiver 2 disclosed in Japanese Patent Application Publication No. 2010-233442 has a load coil 212 (power receive load coil 212), and a power receive coil 211 of the power receive resonance circuit 21 is connected to a load 5 through electromagnetic coupling with the power receive load coil 212. As a result, a change in a self-resonance frequency of the power receive resonance circuit 21 resulting from the effect of the load can be prevented.

SUMMARY OF THE INVENTION

Incidentally, from the perspective of the power transmission efficiency, it is preferred that the degree of coupling (coupling coefficient) between the power receive coil and the power receive load coil of the power receive resonance circuit be high. However, when the degree of coupling between the power receive coil and the power receive load coil is high, a low load impedance lowers a Q value of the power receive resonance circuit, reducing a resonance current of the power receive resonance circuit. This eventually lowers the power transmission efficiency.

Furthermore, the greater the resonance current flowing to the power receive resonance circuit (i.e., the higher the Q value), the greater the relative distance between the power feed resonance circuit and the power receive resonance circuit. Therefore, the decrease in the power transmission efficiency described above becomes prominent as the relative distance between the power feed resonance circuit and the power receive resonance circuit increases.

An object of the present invention is to provide a wireless power receiver, wireless power feeder and wireless power transmission system that are capable of preventing the lowering of power transmission efficiency even when the degree of coupling between a power receive coil and a power receive load coil is high and a load impedance is low.

A wireless power receiver of the present invention is a wireless power receiver which acquire power by a non-contact method from a wireless power feeder, the wireless power receiver having: a power receive resonance circuit that includes a power receive coil and power receive capacitor and acquires power from a power feed coil of the wireless power feeder by means of the power receive coil on the basis of a magnetic field resonance effect between the power feed coil and the power receive coil; a power receive load coil that receives the power fed from the power receive coil by a non-contact method; and an impedance converter that is arranged between the power receive load coil and a load and in which a primary impedance connected to the power receive load coil is higher than a secondary impedance connected to the load.

Here, "a magnetic field resonance effect between the power feed coil and the power receive coil" means a resonance effect of the power receive resonance circuit based on an AC magnetic field caused by the power feed coil. When an AC current flows into the power feed coil, the AC magnetic field is generated by the power feed coil. As a result, the power feed coil and the power receive coil are coupled to each other by the magnetic field, and the power receive resonance circuit resonates. At this moment, for example, the power factor of the transmitted power can be 1 when the frequency of the AC current is substantially the same as the resonance frequency of the power receive resonance circuit, and accordingly highly-efficient power transmission can be realized.

According to this wireless power receiver, the impedance converter is arranged between the power receive load coil and the load. Because the impedance of the impedance converter on the power receive load coil side is high, the lowering of the Q value of the power receive resonance circuit can be prevented even when the degree of coupling between the power receive coil and the power receive load coil is high and the load impedance is low. Therefore, the lowering of the resonance current of the power receive resonance circuit can be prevented. As a result, the decrease in the efficiency of transmitting the power from the wireless power feeder can be prevented.

Although the decrease in the power transmission efficiency resulting from the effect of the load becomes particularly prominent as the distance between the power feed coil and the power receive coil increases, this wireless power receiver yields a great effect of preventing the lowering of the power transmission efficiency when the distance between the power feed coil and the power receive coil is large.

The impedance converter described above may be arranged between the power receive load coil and a plurality of loads, and the primary impedance connected to the power receive load coil may be higher than at least one of a plurality of secondary impedances that are connected respectively to the plurality of loads.

In addition, the impedance converter described above may be a transformer having a primary winding and secondary winding, and the number of turns of the primary winding connected to the power receive load coil may be greater than the number of turns of the secondary winding connected to the load.

A wireless power feeder of the present invention is a wireless power feeder which performs power feed by a non-contact method to the wireless power receiver, the wireless power feeder having: a power feed coil; a resonance current detector which detects a resonance current of the power receive resonance circuit; and a control circuit which performs power feed from the power feed coil to the power receive coil, on the basis of a magnetic field resonance effect between the power feed coil and the power receive coil, by supplying an AC current to the power feed coil, and which associates a frequency of the AC current with a frequency of the resonance current detected by the resonance current detector. The power feed coil described above may not substantially constitute a resonance circuit.

By "the power feed coil does not substantially constitute a resonance circuit," it means that the power feed coil does not form a resonance circuit having the resonance frequency of the power receive resonance circuit as the resonance frequency, and the meaning does not exclude the fact that the power feed coil incidentally resonates with some circuit element. By "the power feed coil does not substantially constitute a resonance circuit," it means, for example, that the power feed coil is not provided in series or parallel with capacitors to form the resonance circuit having the resonance frequency of the power receive resonance circuit as the resonance frequency.

Moreover, "a magnetic field resonance effect between the power feed coil and the power receive coil" means a resonance effect of the power receive resonance circuit based on an AC magnetic field caused by the power feed coil, as already described above. When an AC current is fed to the power feed coil, an AC magnetic field is generated by the power feed coil. As a result, the power feed coil and the power receive coil are coupled to each other by the magnetic field, and the power receive resonance circuit resonates. At this moment, for example, the power factor of the transmitted power can be 1 even when the power feed coil does not resonate by itself, as long as the frequency of the AC current is associated with the resonance frequency of the power receive resonance circuit. Accordingly, highly-efficient power transmission can be realized. By "the frequency of the AC current is associated with the resonance frequency of the power receive resonance circuit," it means that the frequency of the AC current is substantially the same as the resonance frequency of the power receive resonance circuit. Even if the frequency of the AC current is not completely the same as the resonance frequency of the power receive resonance circuit, the power factor of the transmitted power can be increased as long as these frequencies match within an error range of approximately ±20%. As a result, highly-efficient power transmission can be realized. Thus, the meaning of "the frequency of the AC current is associated with the resonance frequency of the power receive resonance circuit" implies that the frequency of the AC current and the resonance frequency of the power receive resonance circuit are substantially equal to each other within the error range of approximately ±20%.

Also, "detects a resonance current of the power receive resonance circuit" means detecting a signal corresponding to the resonance current (information on the resonance current) flowing through the power receive resonance circuit.

Incidentally, the inventors of the present application have discovered that there are two frequencies at which the power factor of the transmitted power becomes 1, in a system that has two resonance circuits—a power feed resonance circuit and power receive resonance circuit—as disclosed in Japanese Patent Application Publication No. 2010-233442. Therefore, in such wireless power transmission system, false operations could occur when controlling phase frequencies at which the power factor of transmitted power is 1.

However, according to this wireless power feeder, there is only one frequency at which the power factor of the transmitted power becomes 1, because the power feed coil does not substantially constitute the resonance circuit. This, therefore, can prevent false operations when controlling the power factor of the transmitted power to 1, or when associating the frequency of the AC current fed to the power feed coil with the frequency of the resonance current of the power receive resonance circuit by using the resonance current detector and the control circuit.

The control circuit described above has: a phase comparator for generating a pulse voltage corresponding to a phase difference between a voltage corresponding to the resonance current detected by the resonance current detector and an output AC voltage; a low-pass filter for smoothing the pulse voltage; a voltage controlled oscillator for generating the output AC voltage that has a frequency based on the smoothed pulse voltage; and a high-frequency amplifier for feeding, to the power feed coil the AC current having a frequency corresponding to the frequency of the output AC voltage.

The inventors of the present application have discovered that false operations could occur when frequency sweep control disclosed in Japanese Patent Application Publication No. 2010-233442 (FIG. 7, for example) is performed in order to associate the frequency of the AC current fed to the power feed coil with the frequency of the resonance current of the power receive resonance circuit, because the frequency of the AC current fed to the power feed coil and the frequency of the resonance current of the power receive resonance circuit vary greatly from each other at each sweep control.

According to this wireless power feeder, however, the control circuit performs control using a so-called phase locked loop (PLL) circuit configured by the phase comparator (phase detector: PD), the low-pass filter (LPF) and the voltage controlled oscillator (VCO), so that the frequency of the AC current fed to the power feed coil and the frequency of the resonance current of the power receive resonance circuit are associated with each other at all times. As a result, the occurrence of the false operations can be prevented.

A wireless power transmission system of the present invention is a wireless transmission system which performs power transmission by a non-contact method between the wireless power feeder and the wireless power receiver that are described above, wherein the power transmission is performed from the power feed coil to the power receive coil on the basis of the magnetic field resonance effect between the power feed coil of the wireless power feeder and the power receive coil of the wireless power receiver.

According to this wireless power transmission system, the wireless power receiver described above acquires power by non-contact method. Therefore, the lowering of the power transmission efficiency between the wireless power feeder and the wireless power receiver can be prevented even when the degree of coupling between the power receive coil and the power receive load coil is high and the load impedance is low. Especially when the distance between the power feed coil and the power receive coil is large, the wireless power transmission system yields a great effect of preventing the lowering of the power transmission efficiency.

The present invention can prevent the lowering of the power transmission efficiency even when the degree of coupling between the power receive coil and the power receive load coil is high and the load impedance is low.

BRIEF DESCRIPTION OF THE DRAWINGS

FIGS. 6A and 6B are schematic diagrams each showing frequency control performed by a wireless power feeder of the wireless power transmission system according to the comparative example;

DESCRIPTION OF THE PREFERRED EMBODIMENTS

Figure 1:
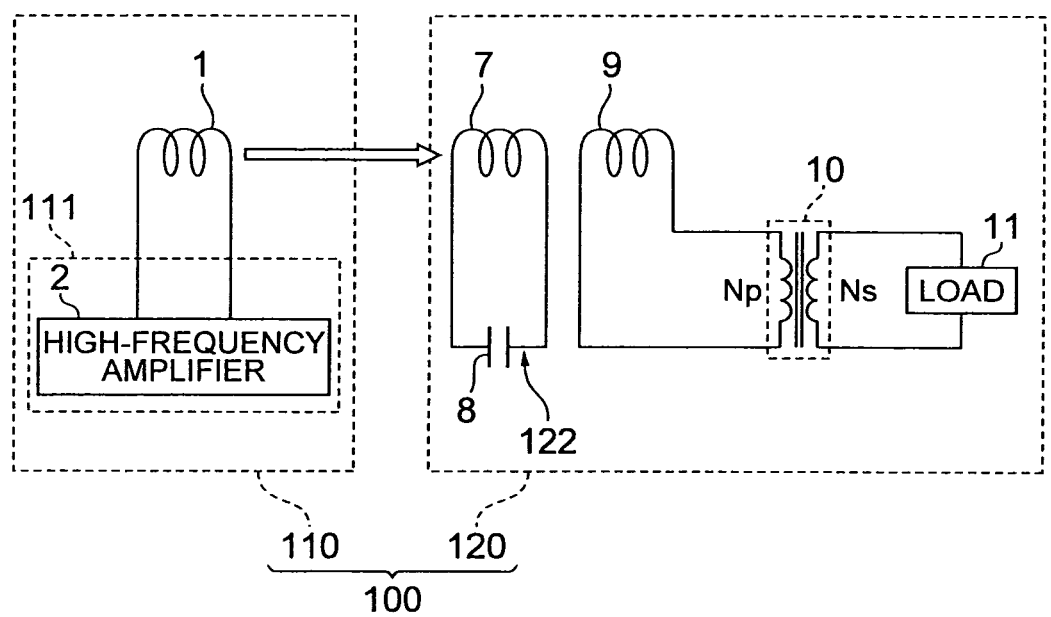
FIG. 1 is a schematic diagram showing a schematic electrical configuration of a wireless power transmission system according to a first embodiment of the present invention.

Preferred embodiments of the present invention are described hereinafter in detail with reference to the drawings. In each of the drawings, like reference characters are used for indicating the same or like parts.

First Embodiment

Figure 2:
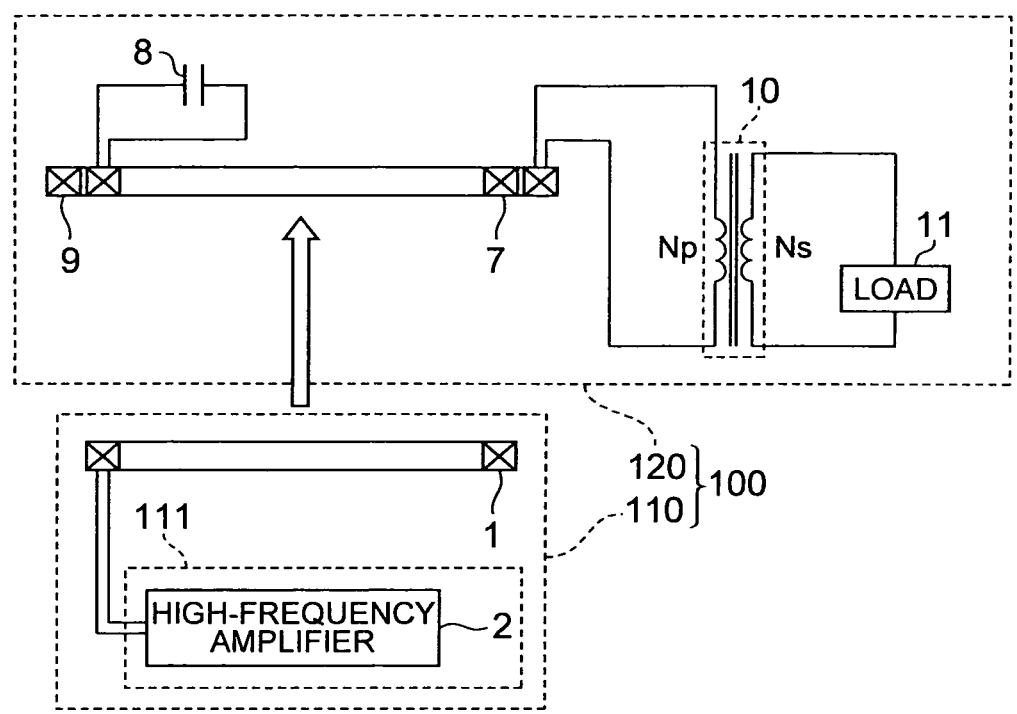
FIG. 2 is a cross-sectional diagram showing physical structures of a power feed coil, power receive coil and power receive load coil shown in FIG. 1.

FIG. 1 is a schematic diagram showing a schematic electrical configuration of a wireless power transmission system according to a first embodiment of the present invention. FIG. 2 is a cross-sectional diagram showing physical structures of a power feed coil, power receive coil and power receive load coil shown in FIG. 1. A wireless power transmission system 100 shown in FIGS. 1 and 2 has a wireless power feeder 110 and wireless power receiver 120 and transmits power from the wireless power feeder 110 to the wireless power receiver 120 by a non-contact method. Note that FIGS. 1 and 2 each schematically show the wireless power feeder.
(First Characteristics)

First, the wireless power receiver 120 is described. The wireless power receiver 120 has a power receive resonance circuit 122 configured by a power receive coil 7 and power receive capacitor 8, a power receive load coil 9, and output transformer (impedance converter) 10.

The power receive coil 7 of the power receive resonance circuit 122 acquires power from a power feed coil 1 on the basis of a magnetic field resonance effect between the power receive coil 7 and the power feed coil 1 in the wireless power feeder 110. The power receive coil 7 is electromagnetically coupled to the power receive load coil 9 and transfers the power to the power receive load coil 9. From the perspective of power transmission efficiency, it is preferred that the degree of coupling between the power receive coil 7 and the power receive load coil 9 be high, and a coupling coefficient between the power receive load coil 9 and the power receive coil 7 is set at, for example, 0.9 or above. In the present embodiment, the power receive load coil 9 is wound outside of and adjacent to the power receive coil 7, as shown in FIG. 2, so that the degree of coupling therebetween is increased. The power receive load coil 9 feeds the power to a load 11 via the output transformer 10.

The primary side of the output transformer 10 is connected to the power receive load coil 9, and the secondary side to the load 11. The number of turns of a primary winding Np of the output transformer 10 is greater than the number of turns of a secondary winding Ns. For this reason, the impedance on the primary side of the output transformer 10 is high, and the impedance on the secondary side of the output transformer 10 is low. In other words, the output transformer 10 is an impedance converter having a high impedance on the primary side and a low impedance on the secondary side. For example, the load 11 has a low impedance of approximately 100Ω, in which case the primary impedance of the output transformer 10 is set at approximately 500Ω.

Figure 3:
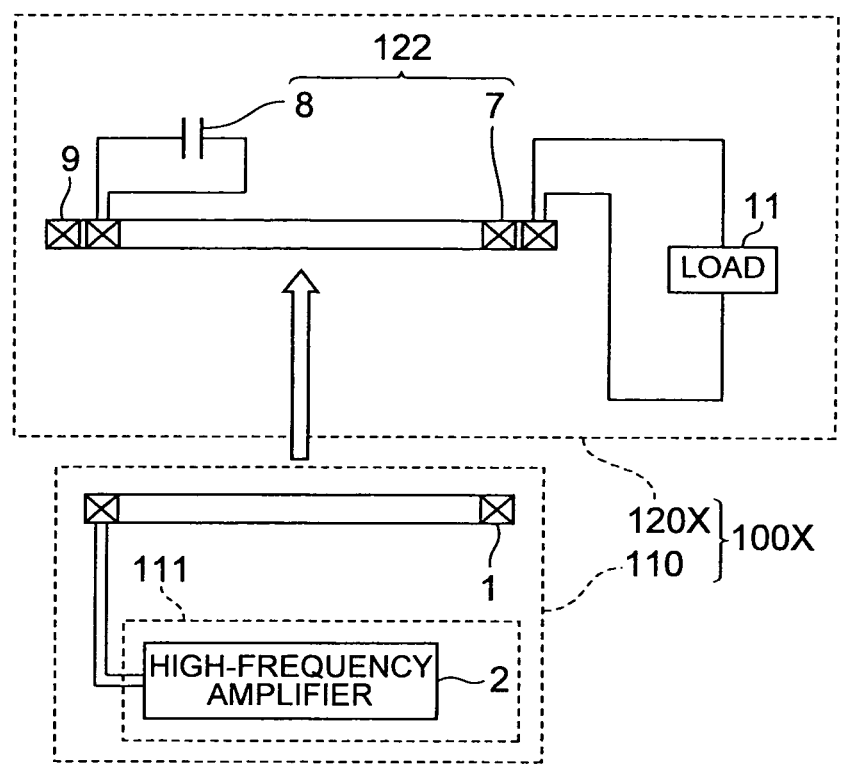
FIG. 3 is a cross-sectional diagram showing a schematic electrical configuration of a conventional wireless power transmission system, as well as physical structures of a power feed coil, power receive coil and power receive load coil of the conventional wireless power transmission system.

FIG. 3 shows a schematic electrical configuration of a conventional wireless power transmission system, as well as physical structures of a power feed coil, power receive coil and power receive load coil of the conventional wireless power transmission system. Unlike the wireless power transmission system 100 of the first embodiment that has the wireless power receiver 120, this conventional wireless power transmission system 100X has a wireless power receiver 120X. In addition, unlike the wireless power receiver 120 of the first embodiment that has the output transformer 10, the wireless power receiver 120X does not have the output transformer 10.

From the perspective of the power transmission efficiency, in the conventional wireless power receiver 120X, when the degree of coupling (coupling coefficient) between the power receive coil 7 and the power receive load coil 9 in the power receive resonance circuit 122 is high, the low impedance of the load 11 reduces a Q value of the power receive resonance circuit 122 due to the influence of the load 11, lowering a resonance current of the power receive resonance circuit 122. As a result, the efficiency of transmitting the power from the wireless power feeder 110 is lowered.

According to the wireless power receiver 120 of the first embodiment, however, the output transformer 10 is disposed between the power receive load coil 9 and the load 11 and the impedance on the power receive load coil 9 side of the output transformer 10 is high. Therefore, even when the degree of coupling between the power receive coil 7 and the power receive load coil 9 is high and the impedance of the load 11 is low, the lowering of the Q value of the power receive resonance circuit 122 can be prevented, and the lowering of the resonance current of the power receive resonance circuit 122 (the lowering of a current value of a current flowing through the power receive resonance circuit 122) can also be prevented. As a result, the decrease in the efficiency of transmitting the power from the wireless power feeder 110 can be prevented. Note that an impedance ratio of the output transformer 10 (a ratio of the primary impedance to the secondary impedance in the output transformer 10) is greater than 1, but is preferably 5 or above when, for example, the impedance obtained when the load 11 is observed from the output transformer 10 is equal to or lower than tens of Ω.

Although the decrease in the power transmission efficiency resulting from the effect of the load 11 becomes particularly prominent as the distance between the power feed coil 1 and the power receive coil 7 increases, the wireless power receiver 120 of the first embodiment yields a great effect of preventing the lowering of the power transmission efficiency when the distance between the power feed coil 1 and the power receive coil 7 is large.

(Second Characteristics)

Figure 8:
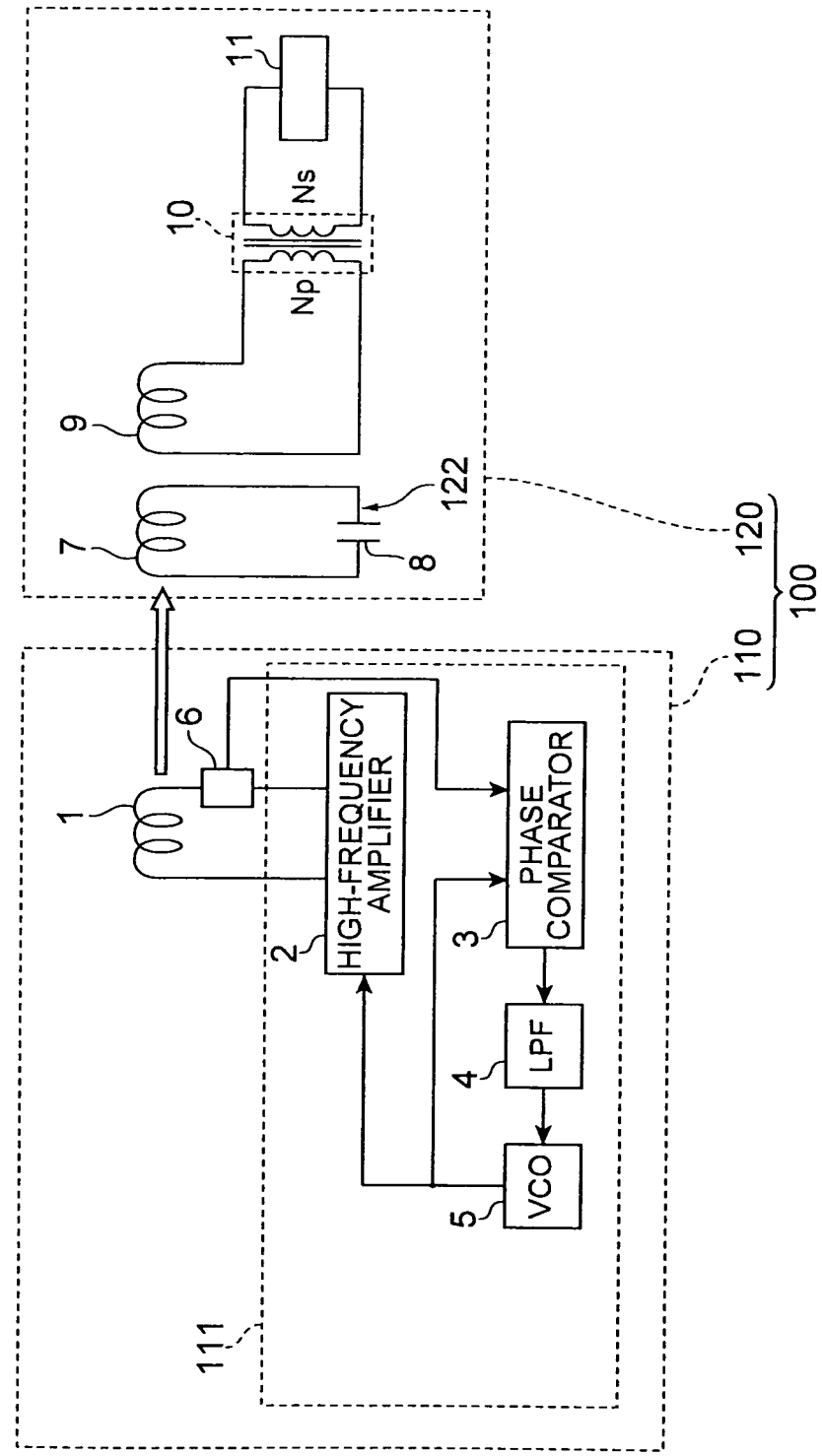
FIG. 8 is a diagram showing an electrical configuration of the wireless power transmission system according to the first embodiment of the present invention, the diagram showing in detail an electrical configuration of the wireless power feeder of FIG. 1.

The wireless power feeder 110 is described with reference to FIG. 8 in addition to FIGS. 1 and 2. FIG. 8 is a diagram showing an electrical configuration of the wireless power transmission system according to the first embodiment of the present invention, the diagram showing in detail an electrical configuration of the wireless power feeder of FIG. 1. This wireless power feeder 110 has the power feed coil 1, a resonance current detector 6, and a control circuit 111.

In the wireless power feeder 110, the control circuit 111 feeds an AC current (e.g., a square-wave or sine-wave current) to the power feed coil 1, whereby power is fed from the power feed coil 1 to the power receive coil 7 on the basis of a magnetic field resonance effect between the power feed coil 1 and the power receive coil 7. Here, "a magnetic field resonance effect between the power feed coil 1 and the power receive coil 7" means a resonance effect of the power receive resonance circuit 122 based on an AC magnetic field caused by the power feed coil 1. When an AC current flows into the power feed coil 1, the AC magnetic field is generated by the power feed coil 1. As a result, the power feed coil 1 and the power receive coil 7 are coupled to each other by the magnetic field, and the power receive resonance circuit 122 resonates.

At this moment, the control circuit 111 makes the frequency of the AC current match the frequency of a resonance current of the power receive resonance circuit 122 that is detected by the resonance current detector 6. Consequently, the power factor of the transmitted power can be 1 even when the power feed coil 1 does not resonate by itself, and accordingly highly-efficient power transmission can be realized. Because the power feed coil 1 and the power receive coil 7 are magnetically coupled to each other, the resonance current detector 6 provided in the wireless power feeder 110 can detect information on the resonance current of the power receive resonance circuit 122. The resonance current of the power receive resonance circuit 122 may be detected directly. In this case, for example, the wireless power receiver 120 is provided with a signal transmission device, and the wireless power feeder 110 is provided with a signal receive device. Then, an information signal of a detection value is transmitted from the signal transmission device provided in the wireless power receiver 120 and received by the signal receive device provided in the wireless power feeder 110. The received information signal may be detected by the resonance current detector 6.

As described above, in the wireless power feeder 110 the power, feed coil 1 does not substantially constitute a resonance circuit. By "the power feed coil 1 does not substantially constitute a resonance circuit," it means that the power feed coil 1 does not form a resonance circuit having a resonance frequency of the power receive resonance circuit 122 as the resonance frequency, and the meaning does not exclude the fact that the power feed coil 1 incidentally resonates with some circuit element. By "the power feed coil 1 does not substantially constitute a resonance circuit," it means, for example, that the power feed coil 1 is not provided in series or parallel with capacitors to form the resonance circuit having the resonance frequency of the power receive resonance circuit 122 as the resonance frequency.

In the wireless power feeder 110, the stronger the coupling between the power feed coil 1 and the power receive coil 7 in the magnetic field, the greater the impact on the resonance frequency of the power receive resonance circuit 122. In other words, when the power feed coil 1 and the power receive coil 7 are brought close to each other to accomplish an adequate magnetic-field coupling therebetween, the resonance frequency of the power receive resonance circuit 122 varies gradually from the resonance frequency of the power receive resonance circuit 122 alone that is obtained when the power feed coil 1 and the power receive coil 7 are separated from each other until the magnetic-field coupling therebetween is negligible. Magnetic field resonance type wireless power feeding can be realized by feeding, to the power feed coil 1, an AC current having a frequency close to the resonance frequency of the power receive resonance circuit 122.

Figure 4A:
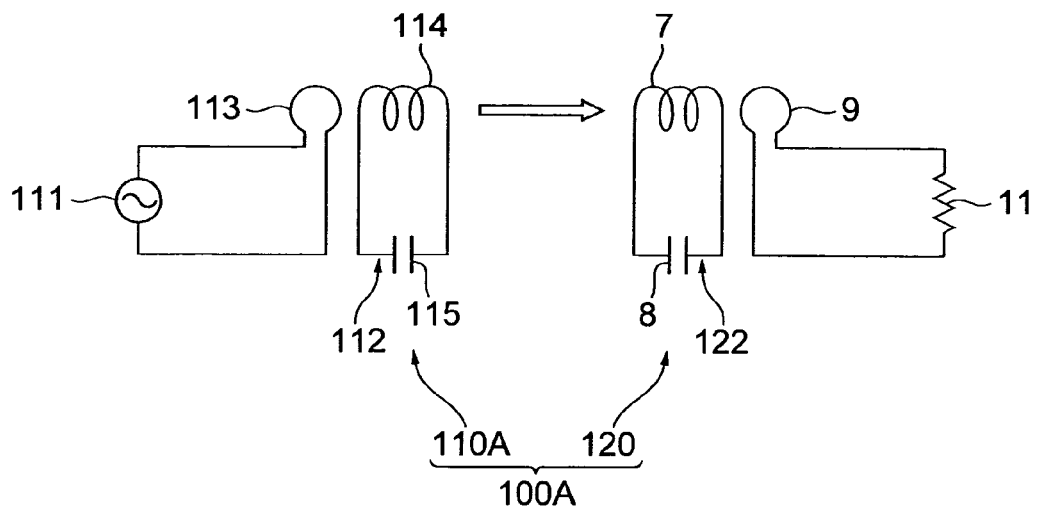
FIG. 4A is a principle diagram of a magnetic field resonance effect of a wireless power transmission system according to a comparative example of the present invention.
Figure 4B:
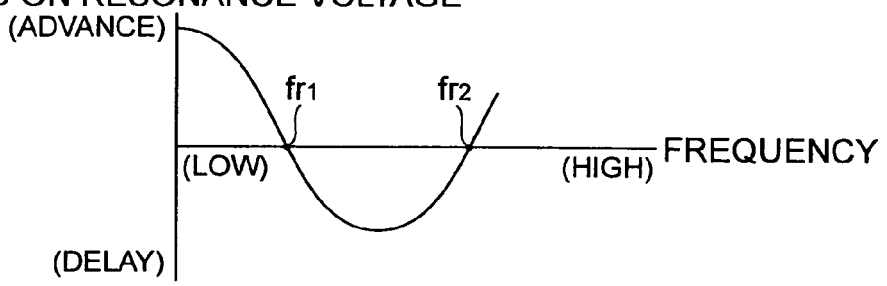
FIG. 4B is a diagram showing frequency-phase characteristics of a resonance current in the magnetic field resonance effect of the wireless power transmission system shown in FIG. 4A.
Figure 5A:
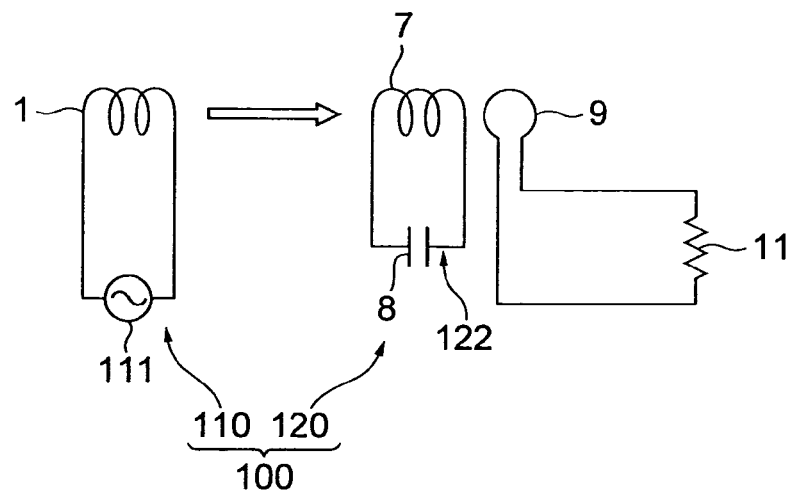
FIG. 5A is a principle diagram of a magnetic field resonance effect of the wireless power transmission system according to the first embodiment of the present invention.
Figure 5B:
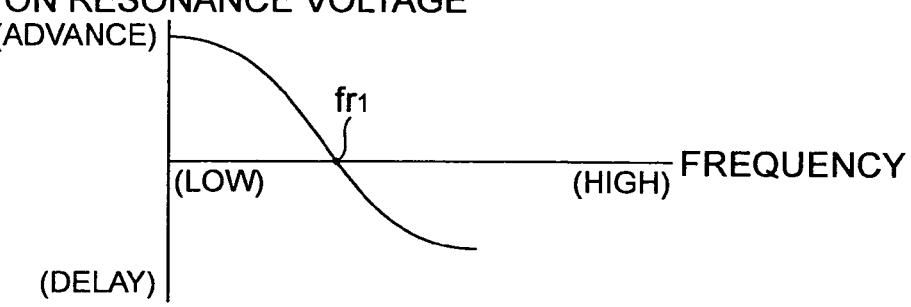
FIG. 5B is a diagram showing frequency-phase characteristics of a resonance current in the magnetic resonance effect of the wireless power transmission system shown in FIG. 5A.

FIGS. 4 and 5 are now referenced. FIG. 5A is a principle diagram of the magnetic field resonance effect of the wireless power transmission system according to the present embodiment. FIG. 5B is a diagram showing frequency-phase characteristics of a resonance current in the magnetic resonance effect of the wireless power transmission system shown in FIG. 5A. On the other hand, FIG. 4A is a principle diagram of a magnetic field resonance effect of a wireless power transmission system according to a comparative example. FIG. 4B is a diagram showing frequency-phase characteristics of a resonance current in the magnetic field resonance effect of the wireless power transmission system shown in FIG. 4A. FIGS. 4B and 5B show frequency characteristics of a phase of a resonance current based on a phase of a resonance voltage. Note that FIG. 4A corresponds to the magnetic field effect of the wireless power transmission system disclosed in Japanese Patent Application Publication No. 2010-233442.

As shown in FIG. 4A, unlike the wireless power transmission system 100 of the present embodiment that has the wireless power feeder 110, a wireless power transmission system 100A of the comparative example has a wireless power feeder 110A. Unlike the wireless power feeder 110 of the present embodiment that has the power feed coil 1, the wireless power feeder 110A has a power feed resonance circuit 112 and power feed excitation coil 113. The power feed resonance circuit 112 is configured by a power feed coil 114 and power feed capacitor 115, wherein the power feed coil 114 is electromagnetically coupled to the power feed excitation coil 113.

In the wireless power feeder 110A, the control circuit 111 feeds an AC current (e.g., a square-wave or sine-wave current) to the power feed excitation coil 113, whereby a resonance current flows to the power feed resonance circuit 112 on the basis of an electromagnetic induction effect between the power feed excitation coil 113 and the power feed coil 114. As a result, power is fed from the power feed coil 114 to the power receive coil 7 on the basis of a magnetic field resonance effect between the power feed coil 114 and the power receive coil 7. From the perspective of the power transmission efficiency, in this wireless power feeder 110A, a resonance frequency of the power feed resonance circuit 112 is set to be equal to the resonance frequency of the power receive resonance circuit 122.

However, the system with two resonance circuits, the power feed resonance circuit 112 and the power receive resonance circuit 122, produces two resonance frequencies at which the power factor of the transmitted power becomes 1, when the power feed coil 114 and the power receive coil 7 are brought close to each other and eventually coupled to each other. In other words, as shown in FIG. 4B, there are two frequencies, fr1 and fr2, at which the phase difference between a resonance current observed from the power feeding side and a resonance voltage is zero. As a result, false operations might occur when the control circuit 111 performs phase/frequency control (automatic follow-up control where the frequency of the AC current becomes equal to the frequency of the resonance current of the power receive resonance circuit 122) for changing the phase/frequency of the AC current fed to the power feed excitation coil 113 so that the power factor of the transmitted power becomes 1, i.e., so that the phase difference between the resonance current and the resonance voltage becomes zero.

On the other hand, in the system of the present embodiment, the power feed coil 1 does not substantially constitute a resonance circuit, and only the power receive resonance circuit 122 is an LC resonance circuit, as shown in FIG. 5A. Therefore, as shown in FIG. 5B, there is only one resonance frequency, fr1, at which the power factor of the transmitted power becomes 1, i.e., at which the phase difference between the resonance current and the resonance voltage becomes zero. Thus, the occurrence of false operations can be prevented when the control circuit 111 performs the phase/frequency control (automatic follow-up control where the frequency of the AC current becomes equal to the frequency of the resonance current of the power receive resonance circuit 122) for changing the phase/frequency of the AC current fed to the power feed coil 1 so that the power factor of the transmitted power becomes 1, i.e., so that the phase difference between the resonance current and the resonance voltage becomes zero.

Note in the present invention that the wireless power transmission system 100A of the comparative example, which has two resonance circuits of the power feed resonance circuit 112 and the power receive resonance circuit 122, is not removed from the scope of right. In other words, the wireless power transmission system 100 shown in FIG. 1 may have the wireless power feeder 110A in place of the wireless power feeder 110 shown in FIG. 5A.

(Third Characteristics)

Next, the control circuit 111 of the wireless power feeder 110 is described in detail with reference to FIG. 8. The control circuit 111 has a high-frequency amplifier 2, phase comparator 3, low-pass filter (LPF) 4, and voltage controlled oscillator (VCO) 5.

The phase comparator 3 generates a pulse voltages corresponding to the phase difference between the voltage that corresponds the resonance current of the power receive resonance circuit 122 detected by the resonance current detector 6 and the voltage from the VCO 5, and outputs the generated pulse voltages to the LPF 4. The LPF 4 averages the pulse voltages obtained from the phase comparator 3, and outputs the result to the VCO 5. The VCO 5 takes the voltage of the LPF 4 as a control voltage and generates an AC voltage having a frequency corresponding to this control voltage. In this manner, the comparator 3, the LPF 4 and the VCO 5 configure a so-called PLL circuit and generate an AC voltage that has a phase frequency corresponding to the phase frequency of the resonance current of the power receive resonance circuit 122 detected by the resonance current detector 6.

In response to this AC voltage, the high-frequency amplifier 2 feeds, to the power feed coil 1, an AC current that has a phase frequency agreeing with the phase frequency of the resonance current of the power receive resonance circuit 122. For example, a sine wave drive circuit is used as the high-frequency amplifier 2, but a switching power supply of a half-bridge circuit using MOS-FET or other switching element can be used as well.

Next, the resonance current detector 6 of the wireless power feeder 110 is described in detail. The resonance current detector 6 acquires information on a resonant state of the power receive resonance circuit 122. For instance, a current sensor, current transformer or the like is used as the resonance current detector 6 to detect the resonance current of the power receive resonance circuit 122. In the present embodiment, a voltage signal is fed to the phase comparator 3 as phase frequency information of the resonance current of the power receive resonance circuit 122.

Figure 7:
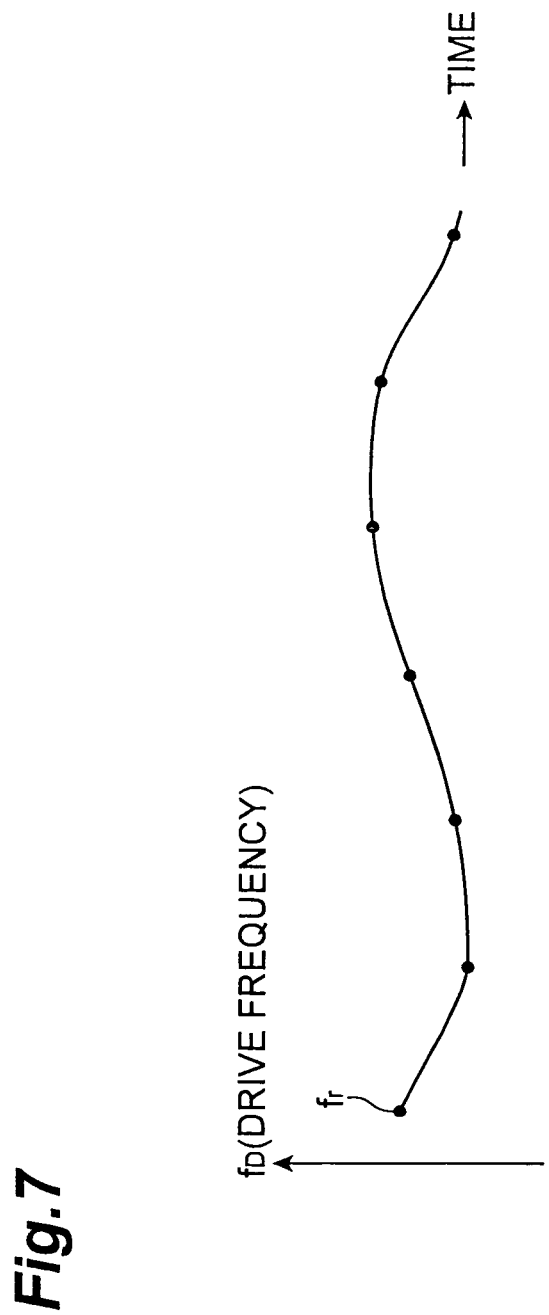
FIG. 7 is a schematic diagram showing frequency control performed by a wireless power feeder of the wireless power transmission system according to the first embodiment.

FIGS. 6 and 7 are now referenced. FIG. 7 is a schematic diagram showing frequency control performed by the wireless power feeder of the wireless power transmission system according to the present embodiment. FIGS. 6A and 6B are schematic diagrams each showing frequency control performed by the wireless power feeder of the wireless power transmission system according to the comparative example. Note that FIGS. 6A and 6B correspond to the frequency control performed by the wireless power feeder disclosed in Japanese Patent Application Publication No. 2010-233442.

As shown in FIG. 6A, the frequency of the AC current fed to the power feed coil 1 is swept in the range of f1 to f2 (sweep characteristics S), and a resonance frequency fr within this frequency sweep range is searched, to set and maintain a frequency f0 of the AC current fed to the power feed coil 1 (frequency sweep control). In this control, when the distance between the power feed coil 1 and the power receive coil 7 gradually changes with time, a big error occurs with respect to each sweeping at each of sweeping times of t1, t2, t3, t6, and power is transmitted intermittently. This might cause a problem of lowering the average power used for driving the load. When the distance between the power feed coil 1 and the power receive coil 7 fluctuates less frequently as shown in FIG. 6B, the problem described above occurs less commonly. However, when the distance between the power feed coil 1 and the power receive coil 7 changes frequently, the problem described above is likely to occur.

On the other hand, according to FIG. 7, in the present embodiment the control circuit 111 performs control by means of the so-called PLL circuit configured by the phase comparator 3, the LPF 4 and the VCO 5. Therefore, even when the distance between the power feed coil 1 and the power receive coil 7 gradually changes with time, the frequency of the AC current is controlled so that the phase difference between the voltage phase and the current phase in the power feed coil 1 is zero at all times. As a result, without any errors, favorable control can be realized in which the frequency of the AC current always follows the frequency of the resonance current of the power receive resonance circuit, whereby the maximum power can be obtained continuously.

According to the configuration of the present embodiment in which the frequency of the AC current flowing to the power feed coil 1 is automatically tuned to the resonance frequency of the power receive resonance circuit, the frequency can follow the changes in the distance between the power feed coil 1 and the power receive coil 7 in real time. Therefore, even when the distance between the power feed coil 1 and the power receive coil 7 increases and drastically changes with time, an effective system can be achieved.

Note in the present invention that the wireless power transmission system of the comparative example, which performs the frequency sweep control in the frequency control of the AC current fed to the power feed coil 1 as shown in FIGS. 6A and 6B, is not removed from the scope of right. In other words, in place of the control circuit 111, a control circuit for performing the frequency sweep control may be configured in the wireless power feeder 110 of the wireless power transmission system 100 shown in FIG. 1.

EXAMPLE

Hereinafter, the wireless power transmission system 100 of the present embodiment shown in FIGS. 1, 2 and 8 is produced and evaluated in an example. This evaluation is a comparative evaluation with respect to the prior art shown in FIG. 3.

Similarities between the example and the prior art
resonance frequency of the power receive resonance circuit 122: Approximately 170 kHz to 200 kHz The power feed coil 1 and the power receive coil 7: An inner diameter of approximately Φ160 mm and a thickness of approximately 10 mm with Litz copper wire in order to reduce the skin effect.

External diameter of the power receive load coil 9: A diameter of approximately Φ200 mm and a thickness of approximately 10 mm with Litz copper wire in order to reduce the skin effect.

Characteristics of the Example

The output transformer 10: A ferrite core was used (e.g., general EE type or EI type ferrite core), with the impedance on the primary side of approximately 500Ω

The load 11: A non-inductive (with zero L component) thick film resistor with a resistance value of approximately 100Ω was used, because an alternate current with a rough sine wave of 200 kHz or lower flows to the load.

Figure 9:
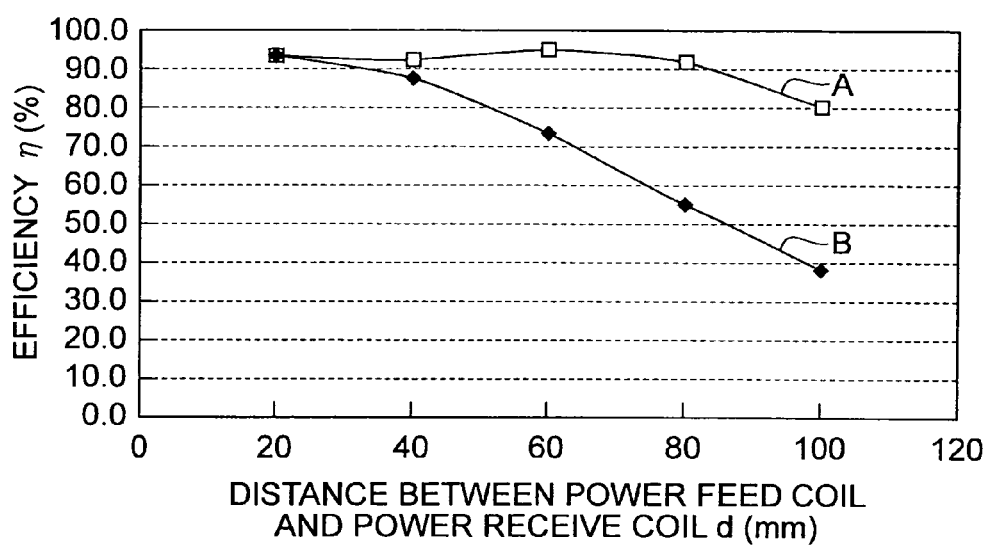
FIG. 9 is a diagram showing the results of measurement on power transmission efficiencies of the wireless power transmission systems of example and comparative example.
Figure 10:
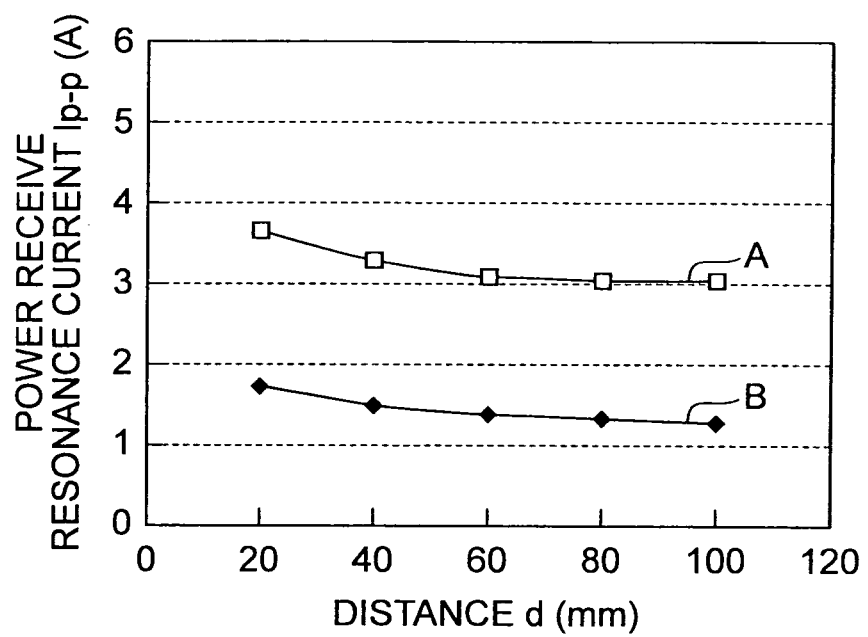
FIG. 10 is a diagram showing the results of measurement on resonance currents of power receive resonance circuits of the wireless power transmission systems of the example and the comparative example.
Figure 11:
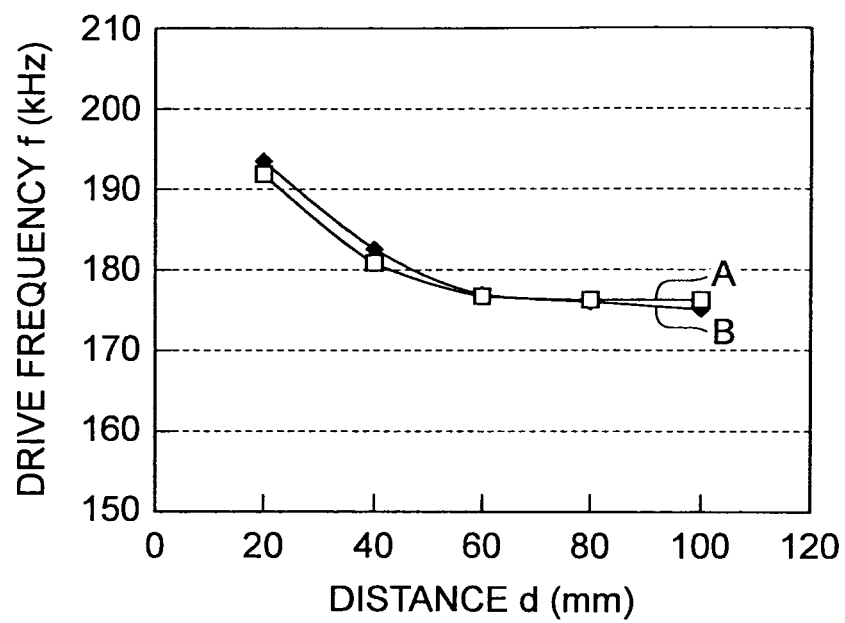
FIG. 11 is a diagram showing the results of measurement on frequencies of AC currents fed to the power feed coils (or power feed excitation coils) of the wireless power transmission systems of the example and the comparative example.

In the present evaluation, the distance between the power feed coil 1 and the power receive coil 7 was changed, and the power transmission efficiency and the frequencies of the resonance current of the power receive resonance circuit 122 and of the AC current fed to the power feed coil 1 (or the power feed excitation coil 113) were measured. The results of the evaluation are shown in FIGS. 9 to 11. In FIGS. 9 to 11, the measurement results of the present example are shown in the curve A and the measurement results of the prior art are shown in the curve B.

According to FIG. 9, the prior art shows that the power transmission efficiency η (%) decreases drastically as the distance d (mm) between the power feed coil 1 and the power receive coil 7 increases (grows). The present example, on the other hand, shows that the power transmission efficiency η is 90% or more, even when the distance d between the power feed coil 1 and the power receive coil 7 is ½ times more than the diameters (inner diameters) Φ of these coils, by setting the input impedance (e.g., 500Ω) on the primary side of the output transformer 10 at 500Ω, which is greater than the impedance 100Ω of the load 11. The present example also shows a small decrease in the power transmission efficiency even when the distance d between the coils further increases. In other words, according to the present example in which the output transformer 10 is provided, the decrease in the power transmission efficiency η can be improved more than the prior art in which the output transformer 10 is not provided. Especially the effect of improving the power transmission efficiency η becomes prominent as the distance d between the power feed coil 1 and the power receive coil 7 increases. Specifically, according to the present example, favorable transmission efficiency can be obtained even when the power feed coil 1 and the power receive coil 7 are separated from each other (even when the distance between these coils is increased).

Moreover, according to FIG. 10, the present example can prevent the lowering of the resonance current flowing to the power receive resonance circuit 122 regardless of the distance d between the coils, compared to the prior art. This means that in the present example a strong magnetic field was generated in the vicinity of the power receive coil 7 and thereby the magnetic field resonance effect become strong.

In addition, according to FIG. 11, the present example and the prior art show substantially the same frequency of the AC current fed to the power feed coil 1 or the power feed excitation coil 113 regardless of the distance d between the coils. Note that the changes in the frequency of the AC current with respect to the distance d between the coils are due to changes in the degree of coupling between the power feed coil 1 and the power receive coil 7.

Second Embodiment

Figure 12:
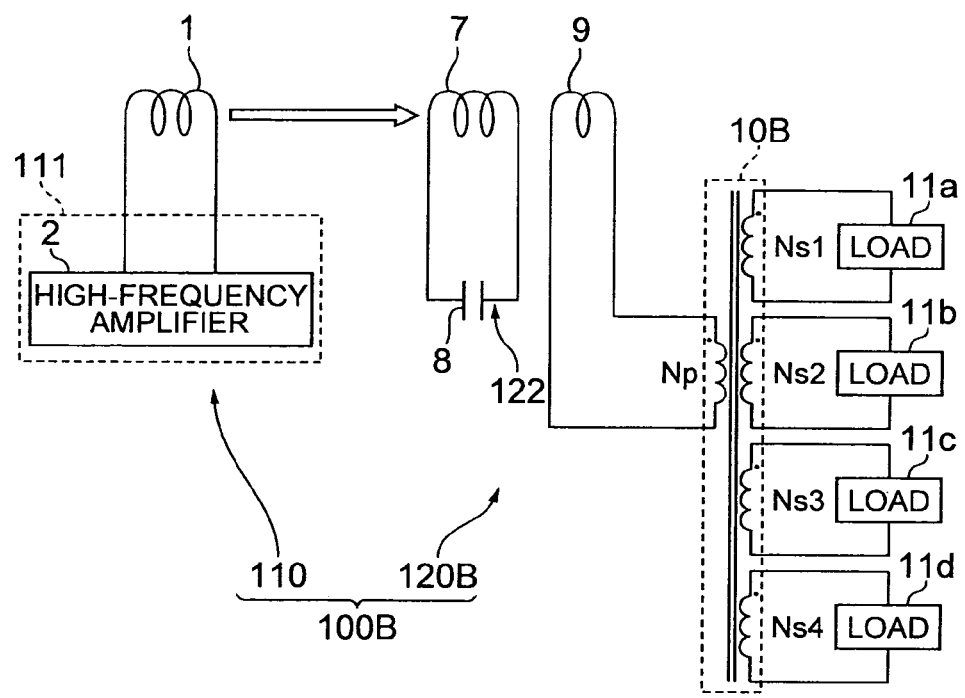
FIG. 12 is a schematic diagram showing a schematic electrical configuration of a wireless power transmission system according to a second embodiment of the present invention.

FIG. 12 is a diagram showing an electrical configuration of a wireless power transmission system according to a second embodiment of the present invention. A wireless power transmission system 100B may have a wireless power receiver 120B in place of the wire less power receiver 120.

Unlike the wireless power receiver 120 of the first embodiment that has the output transformer 10, the wireless power receiver 120B has an output transformer 10B. The output transformer 10B is different than the transformer 10 in that the output transformer 10B has four windings Ns1 to Ns4 on the secondary side so as to be able to produce four outputs. Loads 11a to 11d can be connected to the secondary windings Ns1 to Ns4, respectively. The primary impedance of the output transformer 10B is, for example, 500Ω, whereas the impedances obtained when the loads 11a to 11d are observed from the secondary side of the output transformer 10B are 10Ω, 50Ω, 100Ω and 300Ω, respectively. The number of turns of a primary winding Np of the output transformer 10B is greater than the number of turns of any of the secondary windings Ns1 to Ns4 of the output transformer 10B.

The wireless power receiver 120B according to the second embodiment also can obtain the same advantages as the wireless power receiver 120 of the first embodiment. In other words, according to the wireless power receiver 120B according to the second embodiment, because the primary impedance of the output transformer 10B is greater than any of the impedances of the loads connected to the secondary side of the output transformer 10B, the lowering of the efficiency of transmitting the power from the wireless power feeder 110 to each of the loads can be prevented.

Furthermore, the primary impedance of the output transformer 10B may be greater than at least one of the impedances of the loads on the secondary side of the output transformer 10B. For example, the primary impedance of the output transformer 10B may be 200Ω, which can prevent the lowering of the efficiency of transmitting the power to the loads 11a to 11c. In other words, the lower the impedances obtained when the loads 11 are observed from the secondary side of the output transformer 10B (e.g., equal to or lower than tens of Ω), the more effectively the lowering of the power transmission efficiency can be prevented. Therefore, the advantages same as those of the wireless power transmission system 100 of the first embodiment can be obtained without increasing the number of turns of the primary winding of the output transformer 10B much.

For example, some sort of control needs to be performed in the wireless power receiver 120B. When using a control IC, the winding Ns1 drives the load 11a as a main output. The loads 11b, 11c and 11d (e.g., AC/DC converters) are connected to the windings Ns2 to Ns4 as auxiliary power supplies for the control IC, and DC voltages of +5 V, +12 V, and −12 V are output from the windings Ns2 to Ns4, respectively.

Note that the present invention is not limited to the embodiments described above and can be modified in various ways. For instance, the second embodiment has described that the secondary side of the output transformer 10B has four windings, but the number of secondary windings of the output transformer 10B is not limited thereto. For example, the number of secondary windings of the output transformer 10B may be two, three, five or more.

In the present embodiment, the control circuit 111 performs the control to make the frequency of the AC current fed to the power feed coil 1 agree with the frequency of the resonance current of the power receive resonance circuit 122. However, even if the frequency of the AC current and the resonance frequency of the power receive resonance circuit 122 do not completely agree with each other, as long as the frequency of the AC current and the resonance frequency of the power receive resonance circuit 122 are substantially equal to each other within the error range of, for example, approximately ±20%, the power factor of the transmitted power can be increased, thereby accomplishing highly-efficient power transmission.

In the present embodiment, the control circuit 111 performs the control to make the frequency of the resonance current of the power receive resonance circuit 122 agree with the frequency of the AC current fed to the power feed coil 1, by feeding the power feed coil 1 with the AC current that has the frequency agreeing with the frequency of the resonance current of the power receive resonance circuit 122. However, the control circuit 111 may perform the control to make the frequency of the resonance current of the power receive resonance circuit 122 substantially equal to the frequency of the AC current fed to the power feed coil 1, by, for example, adjusting the inductance of the power feed coil 1.

Moreover, the characteristics of the present invention can be applied not only in power transmission but also in signal transmission. The wireless power transmission system of the present invention can be applied when, for example, transmitting an analog signal or digital signal by a non-contact method by using a magnetic field resonance effect.

It should be noted that the present invention can be applied to the systems performing (1) non-contact power feeding or charging on cellular phones, music players, televisions, game machines and other controllers, as well as LED lighting systems and other home appliances, (2) non-contact power feeding or charging on in-plant delivery robots, two-legged robots, cleaning robots and other industrial instruments, (3) non-contact charging on HEVs, EVs and the like that have, for example, power receive coils disposed in the vehicle bodies thereof, and are charged by power feed coils buried in parking areas or roads, and (4) non-contact power feeding or charging on home appliances and lighting systems of houses by means of solar power.

Note that, in the present specification, the elements for causing the magnetic field resonance phenomena are referred to as "coils," but are often referred to as "transmitters," "antennas" and the like, depending on the related technical fields.

The above has shown and described the principles of the present invention by using the preferred embodiments. However, those skilled in the art are aware that the present invention can be modified in terms of arrangements of the parts and details without departing from such principles. The present invention should not be limited to the specific configurations disclosed in the embodiments. It is understood therefore that the claims appended hereto are meant to cover all amendments and changes made within the scope and spirit of the invention.

What is claimed is:

1. A wireless power receiver which acquires power by a non-contact method from a wireless power feeder,
the wireless power receiver comprising:
a power receive resonance circuit which includes a power receive coil and a power receive capacitor and acquires power from a power feed coil of the wireless power feeder by means of the power receive coil on the basis of a magnetic field resonance effect between the power feed coil and the power receive coil;
a power receive load coil which receives the power fed from the power receive coil by a non-contact method, the power receive load coil being wound around and adjacent to the power receive coil so that at least a part of the power receive coil is positioned inside the power receive load coil; and
an impedance converter which is arranged between the power receive load coil and a load and in which a primary impedance, connected to the power receive load coil is higher than a secondary impedance connected to the load.

2. The wireless power receiver according to claim 1, wherein the impedance converter is arranged between the power receive load coil and a plurality of loads, and the primary impedance connected to the power receive load coil is higher than at least one of a plurality of secondary impedances that are connected respectively to the plurality of loads.

3. The wireless power receiver according to claim 1, wherein the impedance converter is a transformer having a primary winding and secondary winding, and the number of turns of the primary winding connected to the power receive load coil is greater than the number of turns of the secondary winding connected to the load.

4. A wireless power feeder which performs power feed by a non-contact method to the wireless power receiver according to claim 1, the wireless power feeder comprising:

a power feed coil;

a resonance current detector which detects a resonance current of the power receive resonance circuit; and a control circuit which performs power feed from the power feed coil to the power receive coil, on the basis of a magnetic field resonance effect between the power feed coil and the power receive coil, by supplying an AC current to the power feed coil, and which associates a frequency of the AC current with a frequency of the resonance current detected by the resonance current detector.

5. The wireless power feeder according to claim 4, wherein the power feed coil does not substantially constitute a resonance circuit.

6. The wireless power feeder according to claim 4, wherein the control circuit has:

a phase comparator for generating a pulse voltage corresponding to a phase difference between a voltage corresponding to the resonance current detected by the resonance current detector and an output AC voltage;

a low-pass filter for smoothing the pulse voltage;

a voltage controlled oscillator for generating the output AC voltage that has a frequency based on the smoothed pulse voltage; and a high-frequency amplifier for feeding to the power feed coil the AC current having a frequency corresponding to the frequency of the output AC voltage.

7. A wireless power transmission system which performs power transmission by a non-contact method between the wireless power feeder according to claim 4 and a wireless power receiver which acquires power by a non-contact method from a wireless power feeder, the wireless power receiver comprising:

a power receive resonance circuit which includes a power receive coil and a power receive capacitor and acquires power from a power feed coil of the wireless power feeder by means of the power receive coil on the basis of a magnetic field resonance effect between the power feed coil and the power receive coil;

a power receive load coil which receives the power fed from the power receive coil by a non-contact method; and an impedance converter which is arranged between the power receive load coil and a load and in which a primary impedance connected to the power receive load coil is higher than a secondary impedance connected to the load, wherein, the power transmission is performed from the power feed coil to the power receive coil on the basis of the magnetic field resonance effect between the power feed coil of the wireless power feeder and the power receive coil of the wireless power receiver.

8. A wireless power transmission system which performs power transmission by a non-contact method between the wireless power feeder according to claim 6 and a wireless power receiver which acquires power by a non-contact method from a wireless power feeder, the wireless power receiver comprising:

a power receive resonance circuit which includes a power receive coil and a power receive capacitor and acquires power from a power feed coil of the wireless power feeder by means of the power receive coil on the basis of a magnetic field resonance effect between the power feed coil and the power receive coil;

a power receive load coil which receives the power fed from the power receive coil by a non-contact method; and an impedance converter which is arranged between the power receive load coil and a load and in which a primary impedance connected to the power receive load coil is higher than a secondary impedance connected to the load, wherein, the power transmission is performed from the power feed coil to the power receive coil on the basis of the magnetic field resonance effect between the power feed coil of the wireless power feeder and the power receive coil of the wireless power receiver.

\* \* \* \* \*